United States Patent
Morris et al.

(10) Patent No.: US 9,581,525 B2
(45) Date of Patent: Feb. 28, 2017

(54) METHOD OF APPLYING PARTICULATE MATERIAL ALONG A TIRE FOOTPRINT DURING TIRE TESTING ON A TIRE TESTING SURFACE

(71) Applicants: Dylan Morris, Seneca, SC (US); Cedric Mousseau, Simpsonville, SC (US)

(72) Inventors: Dylan Morris, Seneca, SC (US); Cedric Mousseau, Simpsonville, SC (US)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 513 days.

(21) Appl. No.: 14/039,749

(22) Filed: Sep. 27, 2013

(65) Prior Publication Data

US 2014/0090446 A1    Apr. 3, 2014

Related U.S. Application Data

(60) Provisional application No. 61/707,989, filed on Sep. 30, 2012.

(51) Int. Cl.
*G01M 17/02*    (2006.01)

(52) U.S. Cl.
CPC .......... *G01M 17/02* (2013.01); *G01M 17/022* (2013.01)

(58) Field of Classification Search
CPC .................................................... G01M 17/02
See application file for complete search history.

(56) References Cited

U.S. PATENT DOCUMENTS

| 1,669,622 A | 5/1925 | Messer |
| 2,010,049 A | 8/1935 | Abbott, Jr. et al. |

(Continued)

FOREIGN PATENT DOCUMENTS

| CA | 2593751 A1 | 8/2006 |
| DE | 10141972 C1 | 4/2003 |

(Continued)

OTHER PUBLICATIONS

Perry Walraven, Laboratory Tread Wear Simulation, Presented at a meeting of the Rubber Division, American Chemical Society, Cleveland, Ohio on Oct. 17-20, 1995, 28 pgs, MTS Systems Corporation.

(Continued)

*Primary Examiner* — Laura Martin
*Assistant Examiner* — Herbert K Roberts
(74) *Attorney, Agent, or Firm* — Hahn Loeser & Parks LLP; Bret A. Hrivnak, Esq.

(57) ABSTRACT

The present invention includes a method for testing a tire on a tire testing surface, the method comprising the steps of: providing a tire testing surface arranged along a tire testing device; providing a tire having a radially outer annular side comprising a road-engaging surface; engaging forcefully the tire against the tire testing surface, whereby the forceful engagement generates a tire footprint comprising an area of contact between the road-engaging surface of the tire and the tire testing surface; rotating the tire and along the tire testing surface while engaged according to the prior step; and, applying a particulate material along the footprint, the particulate material comprising kaolinite. In other embodiments, particulate material similar to kaolin or kaolinite is employed by such methods in lieu of kaolin or kaolinite.

14 Claims, 4 Drawing Sheets

(56) References Cited

U.S. PATENT DOCUMENTS

| | | | |
|---|---|---|---|
| 2,079,585 A | 5/1937 | Sloman | |
| 2,098,306 A | 11/1937 | Porter | |
| 2,579,727 A | 12/1951 | Carpenter | |
| 2,598,599 A | 5/1952 | Pleasance | |
| 2,766,618 A | 10/1956 | Stiehler et al. | |
| 3,316,758 A | 5/1967 | Wild | |
| 4,174,204 A | 11/1979 | Chase | |
| 4,476,515 A | 10/1984 | Coffee | |
| 4,647,471 A | 3/1987 | Jenkins | |
| 4,718,759 A | 1/1988 | Butler | |
| 4,800,688 A | 1/1989 | Suzuki | |
| 4,647,471 B2 | 4/1989 | Jenkins | |
| 5,111,687 A | 5/1992 | Hill | |
| 5,365,702 A | 11/1994 | Shank, Jr. | |
| 5,504,968 A | 4/1996 | Pressley | |
| 5,636,681 A | 6/1997 | Sulzer et al. | |
| 5,687,906 A | 11/1997 | Nakagawa | |
| 5,703,284 A | 12/1997 | Gerhards et al. | |
| 5,868,326 A | 2/1999 | Speegle | |
| 6,021,962 A | 2/2000 | Hedger | |
| 6,050,876 A | 4/2000 | Ouyang et al. | |
| 6,382,020 B1 | 5/2002 | Fischer et al. | |
| 6,439,041 B1 | 8/2002 | Stalnaker et al. | |
| 6,502,454 B1 | 1/2003 | Macioce, Jr. et al. | |
| 6,510,733 B2 | 1/2003 | Coe et al. | |
| 6,546,791 B2 | 4/2003 | Yurjevich | |
| 6,554,210 B2 | 4/2003 | Holt et al. | |
| 7,036,753 B2 | 5/2006 | Huffman | |
| 7,168,307 B2 | 1/2007 | Jahn et al. | |
| 7,240,708 B2 | 7/2007 | Nomura et al. | |
| 7,254,996 B2 | 8/2007 | Ouyang | |
| 7,396,593 B2 | 7/2008 | Liu et al. | |
| 8,123,147 B2 | 2/2012 | Fulkerson et al. | |
| 8,196,462 B2 | 6/2012 | Stalnaker et al. | |
| 2002/0071957 A1 | 6/2002 | Squitieri | |
| 2003/0094120 A1* | 5/2003 | Golley | C09C 1/42 106/486 |
| 2004/0163455 A1 | 8/2004 | Deniau | |
| 2005/0208225 A1 | 9/2005 | Sakata | |
| 2007/0086861 A1 | 4/2007 | Pratt | |
| 2007/0240614 A1* | 10/2007 | Lynch | C08G 59/5026 106/287.14 |
| 2008/0060574 A1 | 3/2008 | Bacchus et al. | |
| 2009/0012763 A1 | 1/2009 | Langer et al. | |
| 2010/0258014 A1 | 10/2010 | Van Heijningen | |
| 2011/0000292 A1 | 1/2011 | Yoshikawa et al. | |
| 2012/0186324 A1 | 7/2012 | Neugebauer et al. | |

FOREIGN PATENT DOCUMENTS

| | | | |
|---|---|---|---|
| GB | 161621 A | 4/1921 | |
| GB | 326651 A | 3/1930 | |
| GB | 1375312 | 11/1974 | |
| GB | 2264503 A | 9/1993 | |
| JP | 58166240 A | 10/1983 | |
| JP | 3044532 A | 2/1991 | |
| JP | 04181142 A | 6/1992 | |
| JP | 6129954 A | 5/1994 | |
| JP | 03706637 B2 | 9/1994 | |
| JP | 7020030 A | 1/1995 | |
| JP | H0720029 A | 1/1995 | |
| JP | 7146217 A | 6/1995 | |
| JP | H8050082 A | 2/1996 | |
| JP | 8233716 A | 9/1996 | |
| JP | 10331391 A | 12/1998 | |
| JP | 11218470 A | 8/1999 | |
| JP | 2001242056 A | 9/2001 | |
| JP | 3274538 B2 * | 4/2002 | ............... G01N 3/56 |
| JP | 3739029 B2 | 1/2006 | |
| JP | 2006226695 A | 8/2006 | |
| JP | 2007017423 A | 1/2007 | |
| JP | 2008014667 A | 1/2008 | |
| JP | 04070288 B2 | 4/2008 | |
| JP | 2008082709 A | 4/2008 | |
| JP | 2008134080 A | 6/2008 | |
| JP | 2008178815 A | 8/2008 | |
| JP | 04169673 B2 | 10/2008 | |
| JP | 2009122027 A | 6/2009 | |
| JP | 04343791 B2 | 10/2009 | |
| JP | 04371940 B2 | 11/2009 | |
| JP | 4496054 B2 | 7/2010 | |
| JP | 04559617 B2 | 10/2010 | |
| JP | 4609806 B2 | 1/2011 | |
| JP | 04915139 B2 | 4/2012 | |
| KR | 10-0642992 B1 | 11/2006 | |
| KR | 783660 B1 | 12/2007 | |
| KR | 78366081 | 12/2007 | |
| KR | 100783660 B1 | 12/2007 | |
| WO | 2004046001 A2 | 6/2004 | |
| WO | 2005116638 A1 | 12/2005 | |

OTHER PUBLICATIONS

Using the Tire-Pavement Test Apparatus to Investigate the Influence of Time Geometry; Neithalath et al; paper 6, vol. 1, No. 1, 18 pgs, obtained from "http://www.concretepavements.org/IJCP/Vol%201%20No%201/Neithalath%20paper%206%20volume%201%20number%201.pdf".

Machine harnesses sound science to probe causes of road noise by Emil Venere, Mar. 25, 2003, 5 pgs, obtained from http://www.purdue.edu/uns/html3month/030325.Bernhard.tiremach.html.

* cited by examiner

METHOD OF APPLYING PARTICULATE MATERIAL ALONG A TIRE FOOTPRINT DURING TIRE TESTING ON A TIRE TESTING SURFACE

This U.S. Patent application claims priority to and the benefit of U.S. provisional patent application Ser. No. 61/707,989 filed on Sep. 30, 2012, which is incorporated herein by reference.

BACKGROUND OF THE INVENTION

This invention relates generally to the application of particulate material, and more specifically to the application of kaolinite or similar particulate material, along a tire footprint along a tire footprint during tire testing operations on a tire testing surface, such as a simulated road surface arranged along a road wheel or the like.

DESCRIPTION OF THE RELATED ART

Tires are often tested to determine any of a variety of characteristics. In particular instances, in lieu of testing tires on a vehicle, where conditions are difficult to control, tires are tested on a manufactured tire testing surface, which may form a simulated road surface, to better control the test conditions. Still, improvements to tire testing along manufactured tire testing surfaces remain necessary to better achieve results more consistent with real-world results, or achieve increased wear rates for improved productivity.

Manufactured tire testing surfaces may be employed by any of a variety of testing machines or systems. As such, tire testing surfaces may form generally flat or annular surfaces. For example, an annular tire operating surface may extend around a road wheel.

In operation, the tire is forcefully applied against, and rotates along, the tire testing surface. In certain tests, particulate material comprising talc is applied to the tire and/or the tire testing surface for the purpose of arranging the talc along the tire footprint. A tire footprint connotes the area of contact forming an interface between the tire and the tire testing surface. In trying to better attain tire testing results more consistent with real-world results, or at least to achieve more accelerated tread wear rates, it has been determined that tires tested on a road wheel with application of talc along the tire footprint generally wear at a lower rate than tires tested in real-world conditions on a vehicle. Therefore, there is a need to provide an alternative particulate material for application to the tire footprint during tire testing to provide results more consistent with real-world vehicular tire testing.

SUMMARY OF THE INVENTION

The present invention includes a method for testing a tire on a tire testing surface, the method comprising the steps of: providing a tire testing surface arranged along a tire testing device; providing a tire having a radially outer annular side comprising a road-engaging surface; engaging forcefully the tire against the tire testing surface, whereby the forceful engagement generates a tire footprint comprising an area of contact between the road-engaging surface of the tire and the tire testing surface; rotating the tire and along the tire testing surface while engaged according to the prior step; and, applying a particulate material along the footprint, the particulate material comprising kaolinite. In other embodiments, particulate material similar to kaolin or kaolinite is employed by such methods in lieu of kaolin or kaolinite.

The foregoing and other objects, features and advantages of the invention will be apparent from the following more detailed descriptions of particular embodiments of the invention, as illustrated in the accompanying drawings wherein like reference numbers represent like parts of the invention.

DETAILED DESCRIPTION OF PARTICULAR EMBODIMENTS

Figure 1:
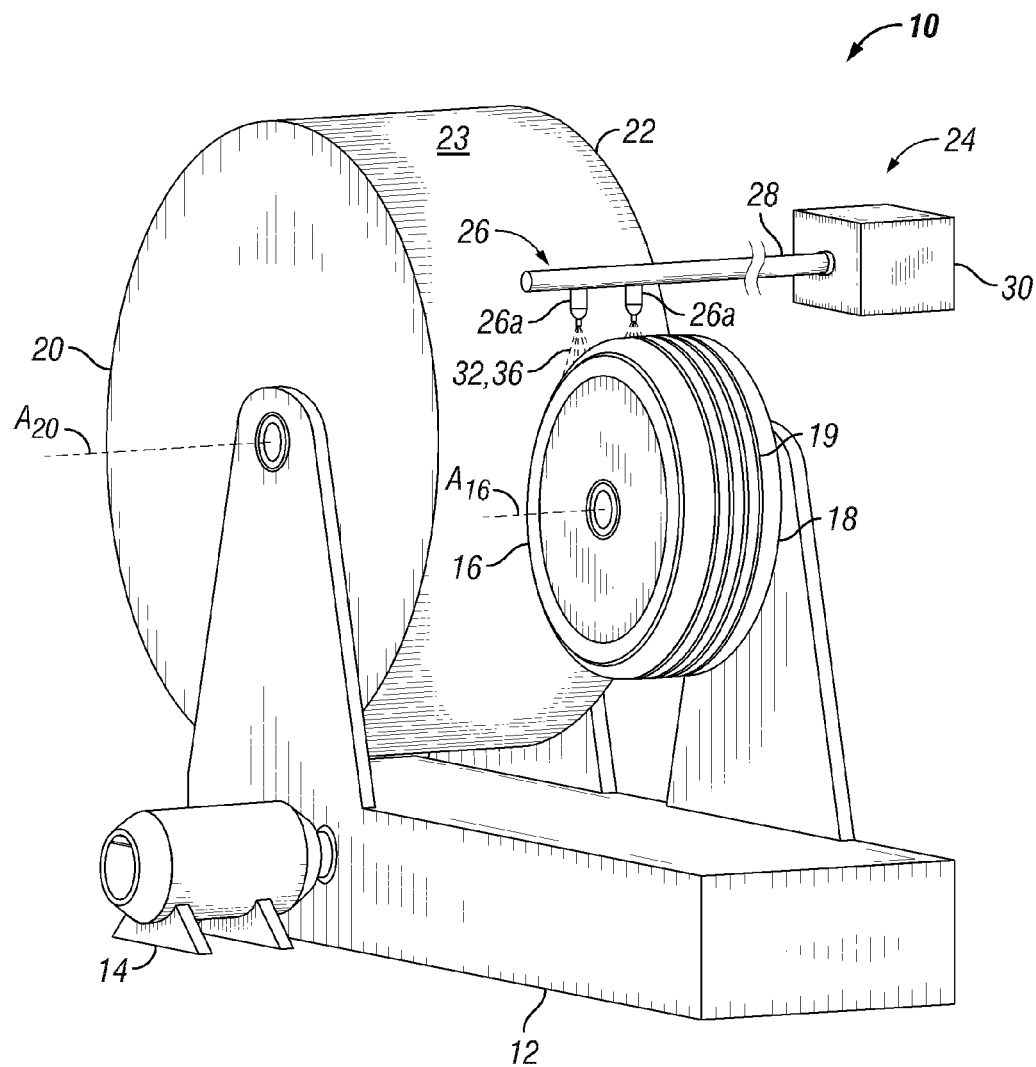
FIG. 1 is a perspective view of a tire testing device comprising a machine including a road wheel having a tire testing surface upon which a tire operates during tire testing operations, the machine including a particulate discharging device comprising a pair of nozzles to direct a flow of particulate material along a tire footprint formed along the tire testing surface of the road wheel in accordance with a particular embodiment of the invention.

As suggested above, there is a need to apply a particulate material—in lieu of talc—along a tire footprint when performing tire tests along a manufactured tire testing surface for the purpose of generating accelerated tire tread wear rates over those achieved with talc, which may be more consistent with the wear rates observed in real-world vehicular testing. This is because it has been found that the application of talc along the tire footprint when testing tires on road wheels has generated tire tread wear rates much lower than real-world vehicular tire testing on real-world road surfaces. As used herein, "real-world road surface" is defined to mean any tire operating surface that a tire mounted on a vehicle would encounter when operating as a vehicle under conditions for which the vehicle was designed or that were reasonably anticipated, such as a street or road. "Manufactured tire testing surface" and "tire testing surface" as used herein, unless otherwise noted, references a tire operating surface that has been formed along or in association with a tire testing device, such as a tire testing machine, where the tire testing surface may be formed of synthetic, natural, or any other material used to form or simulate real-world tire operating surfaces.

In an effort to provide accelerated tire wear rates or more accurate tire test results, methods and apparatus for applying particulate material along a tire footprint during tire testing operations are discussed herein.

In particular embodiments, a method of testing tires on a tire testing surface includes a step of providing a tire testing surface formed along a tire testing device. Tire testing surfaces may comprise any desired surface. For example, the tire testing surface may be designed to represent the surface of any known road formed of any known material, such as, for example, asphalt, stone, gravel, or cement. Still, the tire testing surface may not represent any real-world tire operating surface, but rather may represent any other surface along with the tire is desired to be tested and evaluated. In certain tests, the tire testing surface has texture sufficient to promote tire wear, or that generates sufficient friction to create a slip angle within the tire footprint as the tire turns side-to-side relative the tire testing surface to simulate the turning of a vehicle.

Tire testing surfaces may be arranged along any testing device. For example, tire testing surfaces may be arranged along a road wheel, the road wheel comprising a wheel configured to rotate and upon which the radially outer annular side of the wheel includes the tire testing surface. The radially outer annular side is located radially outward from a rotational axis of the wheel along an outer extent of the wheel, while the tire testing surface may extend discontinuously or annularly around the outer annular side of the wheel. Because the tire testing surfaces may be arranged on any testing device, it is understood that such surfaces may extend in any manner and may be shaped as desired. For example, in lieu of a rounded or annular surface, the tire testing surface may remain generally flat.

Particular embodiments of such methods further include a step of providing a tire having a radially outer annular side comprising a road-engaging surface. The tire provided may comprise any tire. For example, the tire may comprise a pneumatic tire or a non-pneumatic tire, whereby a solid band including a tread layer is arranged along a wheel or the like, such as is commonly used with skid steers. In many embodiments, the radially outer annular side of the tire includes a tread, the tread forming the road-engaging surface upon which the tire rotates and engages the wheel. The tire includes a rotational axis extending in an axial direction of the tire. Furthermore, the tread is formed of a polymeric elastomer, which may be vulcanized, and includes any natural or synthetic rubber or polymeric composition.

Particular embodiments of such methods further include a step of engaging forcefully the tire against the tire testing surface, whereby the forceful engagement generates a tire footprint comprising an area of contact between the road-engaging surface of the tire and the tire testing surface. The step of engaging may comprise translating either or both of the tire testing surface and tire towards the other to generate mutual engagement between the tire testing surface and the tire. The translation may be performed by any known method or device. Upon engagement, an area of contact between the tire testing surface and the tire is generated, which is referred to as a tire footprint. It is understood that the tire may engage the tire testing surface in any desired arrangement. For example, in embodiments where the tire testing surface is arranged along a road wheel, the axes of rotation of each the tire and wheel are parallel or biased from a parallel arrangement.

Particular embodiments of such methods further include a step of rotating the tire along the tire testing surface while engaged according to the prior step. Once the tire and tire testing surface are engaged, the tire rotates along the tire testing surface, such as the radially outer annular surface of a road wheel. Rotation of the tire and/or tire testing surface may be facilitated by any known method or device. In performing the step of rotating, it is understood that the tire and/or tire testing surface may be driven to accomplish the step of rotating. In doing so, a drive source is arranged in operable communication with tire and/or the tire testing surface, or any structure in operable communication with the tire testing surface. The drive source may comprise any drive source known to one of ordinary skill in the art, and may comprise, for example, a motor.

Particular embodiments of such methods further include a step of applying a particulate material along the footprint, the particulate material comprising kaolinite particulate material. In an effort to increase tire wear rates beyond those achieved using talc and/or to provide tire wear rates more consistent with the wear rates obtained from vehicular testing along road surfaces, different particulate material is employed when testing tires on tire testing surfaces. In particular instances, such methods employ particulate material configured to increase the wear rate approximately 100% over wear rates achieved using talc. In other words, the wear rate using the improved particulate material is equal to approximately 200% the wear rate obtained using talc. To more broadly define the improvement over talc, the improved particulate material may achieve a 50% to a 150% increase in wear rate—or, in other words, a wear rate equal to 150% to 250% the wear rate achieved using talc.

By example, particulate material comprising kaolinite is employed as a substitute for talc for the purpose of increasing tire wear rates approximately 100% over the wear rates achieved using talc. Kaolinite is a hydrated aluminum silicate of the kaolinite group (which includes dioctahedral minerals kaolinite, dickite, nacrite, and halloysite, and the trioctahedral minerals antigorite, chamosite, chrysotile, and cronstedite) of clay minerals. Kaolinite has a chemical formula of $Al_2Si_2O_5(OH)_4$. Kaolinite may be provided in "pure" form or as a composition, such as kaolin, which is a naturally occurring clay containing kaolinite with trace amounts of other impurity materials, such as mica, quartz, feldspar, and illmenite, which can be removed by a water-washing process. Accordingly, "kaolinite particulate material," as used herein, comprises pure kaolinite or a composition predominately comprising kaolinite, such as kaolin.

In particular, kaolinite or kaolin is characterized as having a triclinic crystal system. Furthermore, kaolinite or kaolin comprises particulate having a Mohs hardness of approximately 1.5 to 2.5, and in particular instances a Mohs hardness of 1.5 to 2 or 2 to 2.5, and a specific gravity of approximately 2.16 to 2.68 or approximately 2.6. Kaolinite particulate material may also be processed to provide any desired particle size and form. For example, the kaolinite particulate material may comprise particles having a size ranging from approximately 1 to 20 micrometers (also known as microns, which is denoted as "μm" and represents 1 meter×$10^{-6}$). By further example, the kaolinite particulate material supplied may have an average size of approximately 5.7 microns. In particular instances, the kaolin employed undergoes a delamination process whereby the kaolinite particulate material is milled to separate kaolinite particles arranged as stacked plates into individual plates. Surface area for the particulate forming the kaolinite particulate material is approximately 15 $m^2/g$ BET. In comparison, the talc previously employed comprised a monoclinic or triclinic crystal system, a Mohs hardness of approximately 1, a specific gravity of approximately 2.58 to 2.83, had a median particle size of approximately 100 microns, and a surface area of approximately 1 to approximately 5 $m^2/g$ BET (Brunauer, Emmett, and Teller). Talc has a chemical formula of $Mg_3Si_4O_{10}(OH)_2$.

It is also appreciated that in lieu of kaolinite, the particulate material for use in such tire testing methods may comprise any other mineral contained within the kaolinite group of minerals, whether in a pure or compositional form, natural or processed. For example, those minerals within the kaolinite group having a hardness (Mohs 1.5-2.5 or 2.0-2.5), specific gravity, crystal structure, a surface area (approximately 15 $m^2/g$ BET), and/or a particle size similar or approximately equal to kaolinite may be employed. Furthermore, any other mineral having a hardness (Mohs 1.5-2.5 or 2.0-2.5), specific gravity, crystal structure, a surface area (approximately 15 $m^2$/g BET), and/or a particle size similar or approximately equal to kaolinite may be employed regardless of whether it is categorized within the kaolinite group. For example, gypsum, which has a hardness of approximately Mohs 1.5 to 2 may operate as the particulate material for use in such methods of tire testing. Gypsum has a chemical formula of $CaSO_4 2H_2O$, a specific gravity of approximately 2.31 to 2.33, and a monoclinic crystal structure.

It is understood that the step of applying may occur by way of any known method or device. For example, the particulate may be applied manually, by hand, by use of a hand tool, or by use of machinery. By further example, the particulate may be applied automatically by use of any desired machine. It is also understood that the particulate may be applied alone or in combination with any other material, such as a gas in a gas-particulate mixture. For example, a gas-particulate mixture may be discharged from an aperture, such as from an aperture arranged within a particulate discharging device, while the tire is engaged to the wheel and both are rotating relative the other. In such embodiments, the aperture forms a particulate discharge outlet of a particulate-receiving chamber arranged within the particulate discharging device. The particulate-receiving chamber receives the gas-particulate mixture from a particulate inlet prior to the step of discharging a gas-particulate mixture. The gas-particulate mixture may be formed by employing any known method or device, such as by using a venturi mixer.

As suggested above, in particular embodiments, such methods are performed to evaluate the wear rate of a tire tread. As such, the steps of engaging forcefully the tire against the tire testing surface and rotating the tire along the tire testing surface will continue for a sufficient duration to sufficiently evaluate a wear rate of a tread arranged along the radially outer annular side of the tire. Furthermore, in testing tire tread wear, the test conditions may be arranged and controlled as desired. This includes temporarily stopping the test and restarting and altering the speeds and the slip angles of the tire during the tire test.

These methods for testing tires by applying particulate material along a tire footprint for a tire being tested on a road wheel may be achieved manually or automatically, in whole or in part. Exemplary embodiments of a tire testing device for use in performing such methods are discussed in further detail below. The device(s) shown in the figures only exemplify any of a variety of tire testing devices that may be employed within the scope of this invention.

With reference to FIG. 1, an exemplary tire testing device 10 comprising a tire testing machine is shown. The machine 10 includes a base or housing 12 to which a tire 16 and a wheel 20 are rotatably attached (that is, configured to rotate). A drive source 14 is also included for driving the wheel and/or the tire, which may comprise any drive source known to one of ordinary skill in the art, such as a motor.

With continued reference to FIG. 1, the wheel 20 includes a radially outer annular side 22 having a tire operating surface 23 forming a tire testing surface to which the tread 19 of the tire 16 is forcefully applied and engaged with during tire testing operations. While the tire operating surface may extend discontinuously around the outer side, in the embodiment shown, the surface 23 extends lengthwise in a circumferential direction about the outer side 22 to form an annular surface, while the tread 19 forms a road-engaging surface along a radially outer annular side 18 of the tire 16. Rotational axes of the tire 16 and the wheel 20 are identified as $A_{16}$ and $A_{20}$, respectively.

Figure 2:
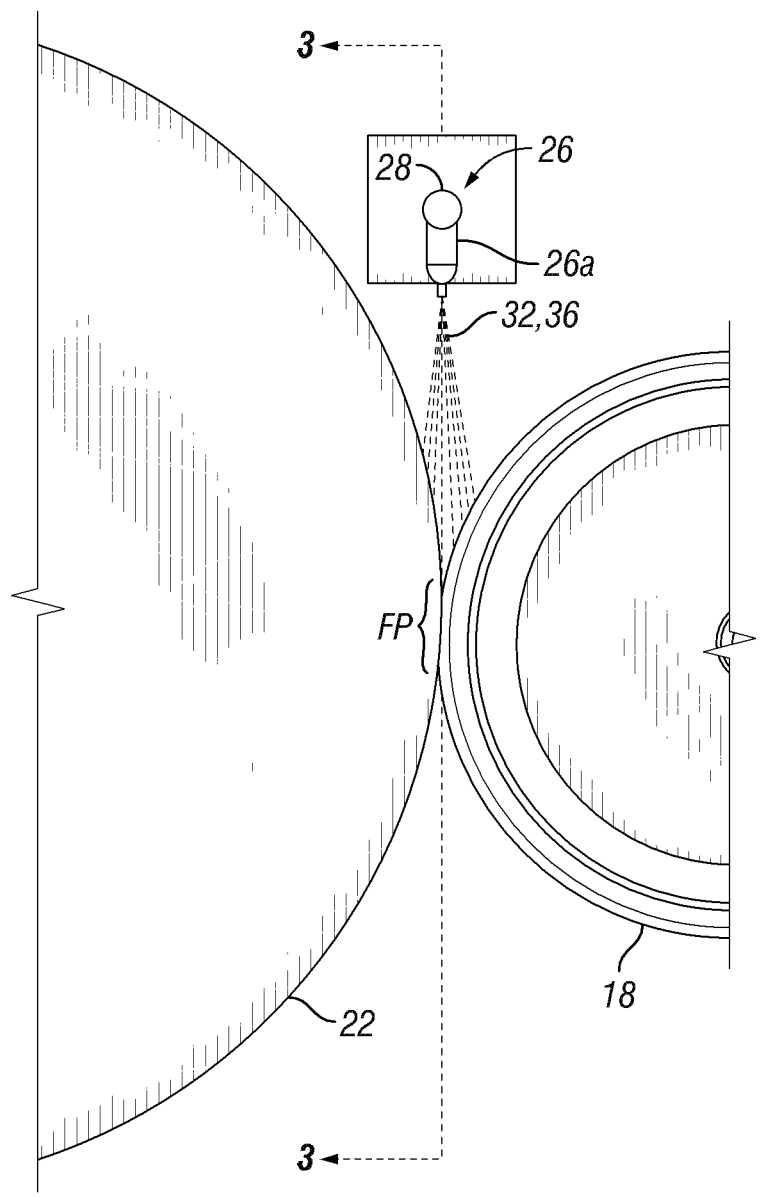
FIG. 2 is a side view of the tire testing device of FIG. 1.

The tire testing device 10 of FIG. 1 further includes a particulate discharging system 24 including a particulate discharging device comprising 26 a pair of nozzles 26a configured to discharge a flow of particulate material 32 for the purpose of applying particulate material along the tire footprint. The particulate material 32 may comprise any particulate material discussed in association with the methods above, including kaolin or kaolinite. In applying particulate material along the tire footprint, it is understood that the particulate material may be applied to portions of either or both of the tire operating surface 23 and the road-engaging surface 19 of the tire prior to each portion entering the tire footprint—that is, prior to a portion of the tire contacting a portion of the wheel as each rotates. In FIG. 2, a side view of the discharging device 26 is shown directing a flow of particulate material 32 into a tire footprint FP.

As shown in FIGS. 1 and 2, the discharging device 26 is arranged in close relation, or adjacent, to the tire operating surface 23 and the road-engaging surface 19. "In close relation" means that the device is arranged in sufficient proximity to the radially outer annular sides of the wheel and/or of the tire such that the flow of particulate material being discharged from the discharging device is able to apply a desired amount of particulate material to the intended wheel and/or tire surfaces. It is appreciated that, in other variations, the discharging device 26 may be arranged in close relation, or adjacent, to either the tire operating surface 23 or the road-engaging surface 19, since the particulate material may be applied to either the wheel or the tire. In the embodiment shown in FIGS. 1 and 2, the flow of particulate material 32 is directed at the interface between the wheel and the tire, which is where the tire footprint FP is formed. In this arrangement, the flow may apply particulate material to the radially outer annular side of both the wheel and the tire.

The particulate discharging system 24 in FIG. 1 includes a delivery system for delivering particulate material to the discharging device 26. In the delivery system shown, the particulate material is dispersed into a gas flow and supplied as a gas-particulate mixture forming a flow of particulate material. To facilitate delivery, the delivery system includes a supply conduit 28 arranged in operable communication with a supply 30 of particulate material, which supplies the gas-particulate mixture in the present embodiments. To complete delivery, supply conduit 28 is arranged in operable communication with each nozzle 26a. It is understood that the gas and particulate material may be mixed according to any known device or method, such as by employing a venturi mixer, for example. The gas employed may comprise air (a mixture of atmospheric gases), or any other desired gas or mixture of gases. Furthermore, the gas may be conditioned as desired before or after receiving the particulate material (referred to herein as a "gas-particulate mixture"). For example, the gas or gas-particulate mixture may be conditioned to eliminate moisture or any other desired substance. By further example, the temperature of the gas or gas-particulate mixture may be controlled. It is understood that the delivery system shown is exemplary, as any delivery system known to one of ordinary skill in the art may be employed to supply a flow of gas containing particulate material to the discharging device. It is also understood that the particulate material may be supplied to and discharged from the discharge device in any form without any gas flow or formation of a gas-particulate mixture.

Figure 3:
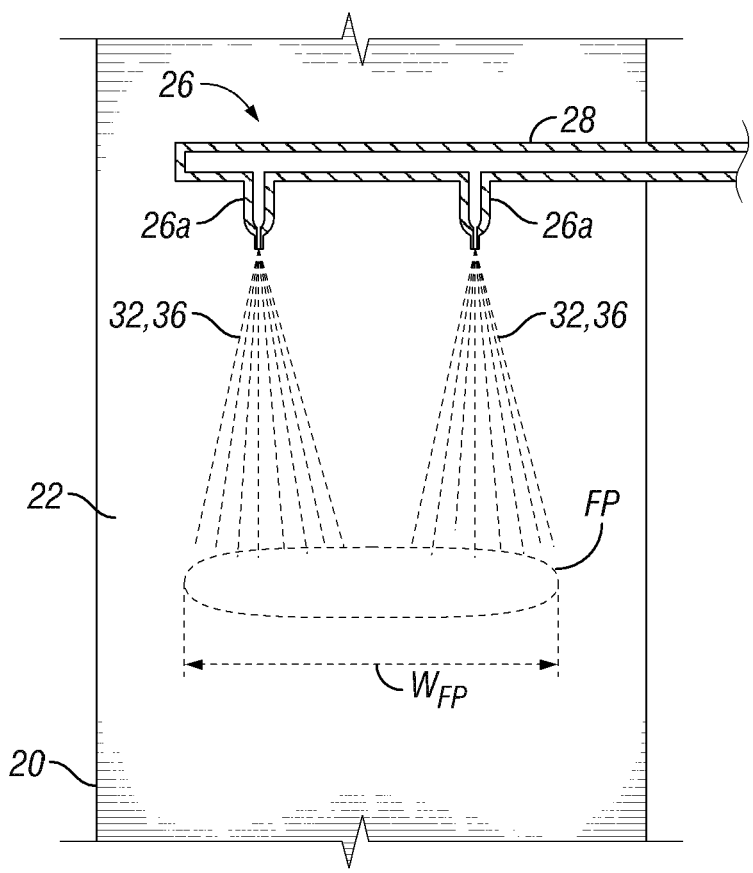
FIG. 3 is a sectional view of the tire testing device taken along line 3-3 in FIG. 2 showing the particulate discharging device applying particulate material into the tire footprint along the road wheel.

With particular reference to FIG. 3, the particulate discharge device 26 is shown discharging particulate material 32 onto the radially outer annular side of the tire 16 and/or the wheel 20 for use within a tire footprint FP. In particular, FIG. 3 more clearly shows the particulate material 32 being applied to the tire footprint and across a width $W_{FP}$ of the footprint FP. As can be seen, the footprint width $W_{FP}$ is not greater than the tire width.

Figure 4:
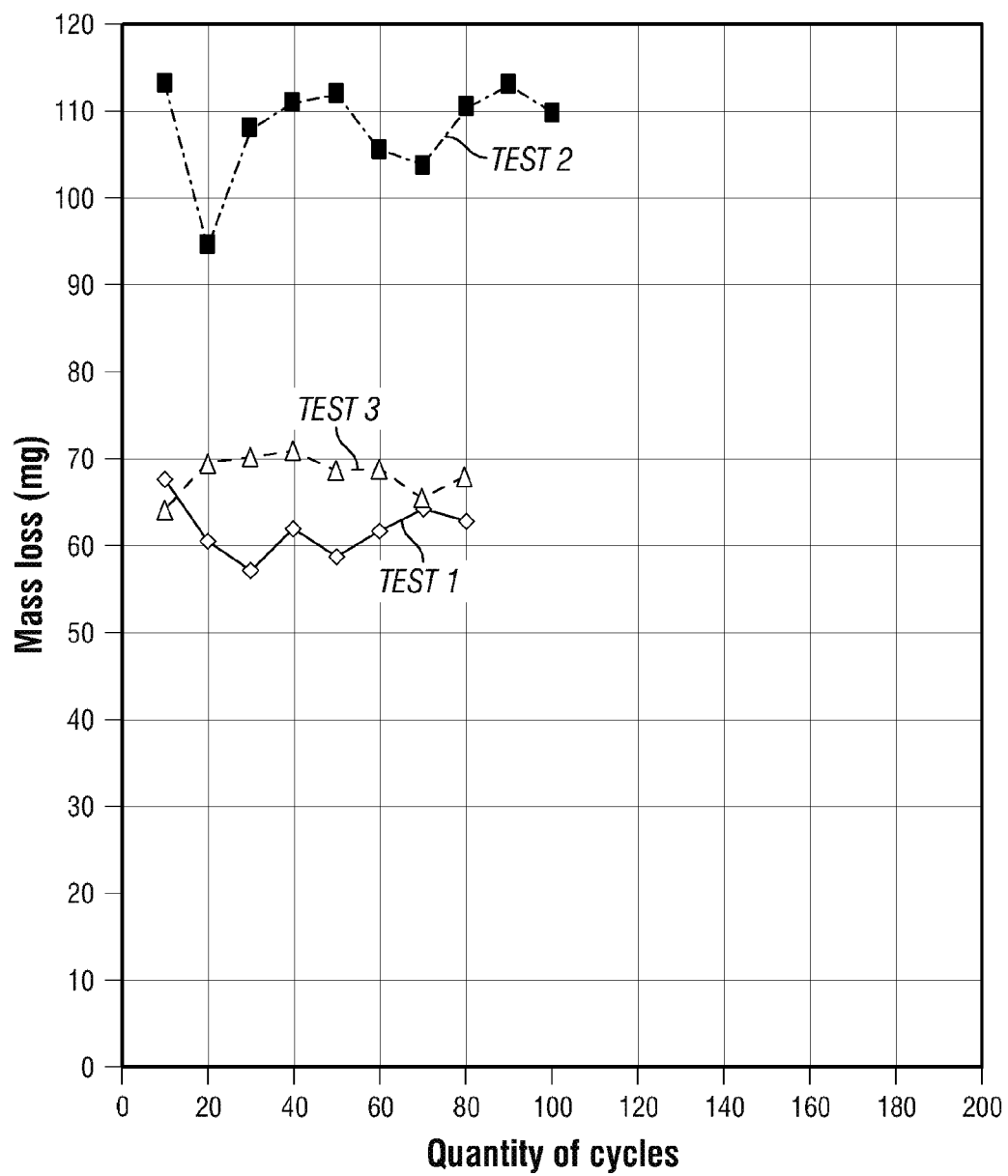
FIG. 4 is chart comparing the wear observed separately using kaolin and talc during tribometer/tribotester testing of tire tread material samples.

With reference to FIG. 4, a chart is shown comparing the wear of tire tread material observed when evaluating the use of talc versus kaolin as particulate material under the same test conditions. In particular, talc and kaolin were separately applied to separate samples formed of the same tire tread material while evaluated using a tribometer or tribotester. Approximately 500 milligram (mg) of particulate material was used in each test. With reference to the chart of FIG. 4, Test 1 evaluated the wear of a tire tread material sample using talc. Subsequently, Test 2 was performed on a like sample of tire tread material under the same test conditions, except that kaolin was substituted for the talc. Finally, the use of talc was re-performed in Test 3 using another like sample of tire tread material. The amount of wear was measured as each test endured, the measurements being taken at the conclusion of particular cycles during the testing process, which is measured as mass loss in milligrams (mg) in the chart of FIG. 4. In summary, the average mass loss observed for samples tested using talc totaled approximately 65 mg while the average wear loss observed for the sample tested using kaolin totaled approximately 108 mg. Based upon this data, testing employing kaolin exhibits approximately 66% more wear than the testing using talc.

While this invention has been described with reference to particular embodiments thereof, it shall be understood that such description is by way of illustration and not by way of limitation. Accordingly, the scope and content of the invention are to be defined by the terms of the appended claims.

What is claimed is:

1. A method for testing a tire on a tire testing surface, the method comprising the steps of:
   providing a tire testing surface arranged along a tire testing device;
   providing a tire having a radially outer annular side comprising a road-engaging surface;
   engaging forcefully the tire against the tire testing surface, whereby the forceful engagement generates a tire footprint comprising an area of contact between the road-engaging surface of the tire and the tire testing surface;
   rotating the tire along the tire testing surface while engaged according to the prior step; and,
   applying a particulate material along the footprint, the particulate material consisting essentially of kaolinite.

2. The method of claim 1, wherein the tire testing surface is arranged along a road wheel configured to rotate, the wheel having a radially outer annular side including a tire operating surface comprising the tire testing surface, and the radially outer annular side being arranged outwardly from a rotational axis of the wheel in a radial direction of the wheel.

3. The method of claim 2, wherein the step of engaging comprises engaging forcefully the tire against the tire testing surface of the road wheel, whereby the forceful engagement generates the tire footprint between the road-engaging surface of the tire and the tire testing surface of the wheel.

4. The method of claim 3, wherein the step of rotating comprises rotating the tire and the road wheel while engaged according to the step of engaging.

5. The method of claim 2, wherein the step of applying a particulate material along the footprint comprises applying the particulate material to the radially outer annular surface of the tire and/or the tire testing surface of the road wheel.

6. The method of claim 2, wherein the steps of engaging forcefully the tire against the tire testing surface and rotating the tire and the road wheel continue for a sufficient duration to sufficiently evaluate a wear rate of a tread arranged along the radially outer annular side of the tire.

7. The method of claim 1, wherein the particulate material has a Mohs hardness of approximately 1.5 to 2.5.

8. The method of claim 7, wherein the particulate material has a Mohs hardness of approximately 1.5 to 2.

9. The method of claim 7, wherein the particulate material has a Mohs hardness greater than 2.

10. The method of claim 1, wherein the particulate material has a specific gravity greater than or equal to 2.16 but less than approximately 2.6.

11. The method of claim 1, wherein the particulate material comprises particulate having a size ranging from approximately 1 to 20 micrometers.

12. The method of claim 1, wherein the particulate material comprises particulate having an average size of approximately 5.7 micrometers.

13. The method of claim 1, wherein the particulate material undergoes a delamination process prior to application to the footprint.

14. The method of claim 1, wherein the particulate material has particulate having a surface area of approximately 15 $m^2$/g BET.

* * * * *